Aug. 8, 1939.  K. E. BEMIS  2,168,389
APPARATUS FOR MAKING SANDWICHES
Filed Jan. 3, 1938
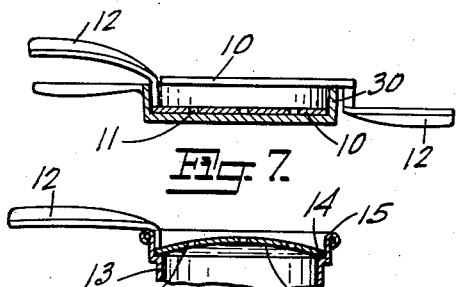
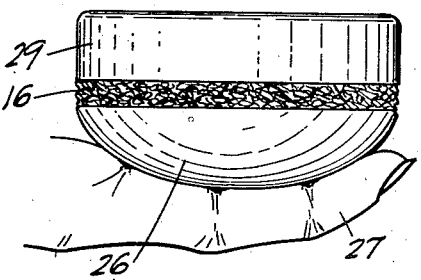
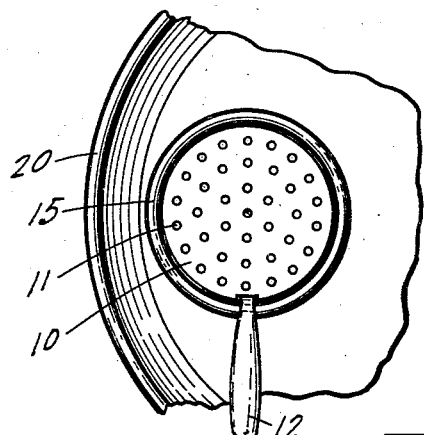
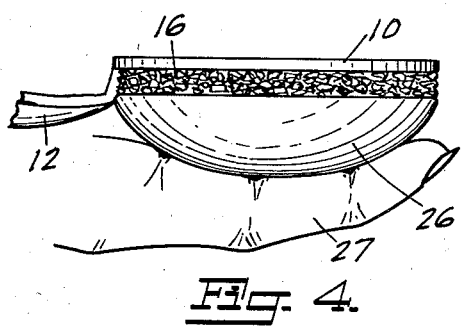
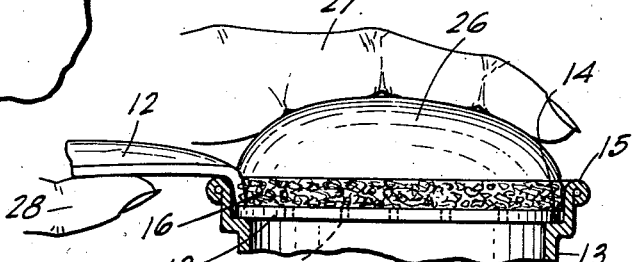
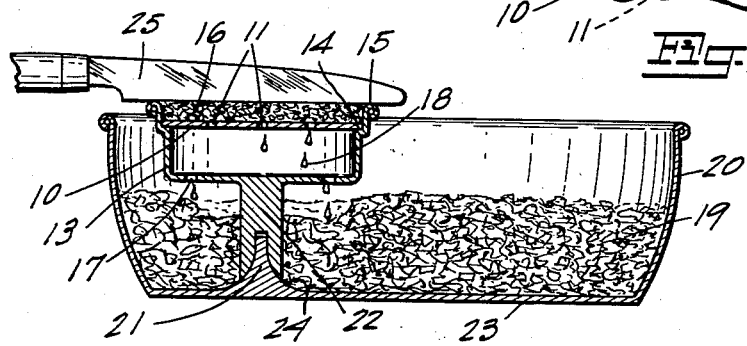
Inventor
Kenneth E. Bemis
By Philip A. Friedell
Attorney Patented Aug. 8, 1939

2,168,389

UNITED STATES PATENT OFFICE 2,168,389

APPARATUS FOR MAKING SANDWICHES

Kenneth E. Bemis, Oakland, Calif.

Application January 3, 1938, Serial No. 183,112

3 Claims. (Cl. 107—1)

This invention relates to the forming of sandwich fillers to predetermined thickness, area, and shape, and to the making of sandwiches, and also to the forming of meat patties for cooking to predetermined size and shape.

The present method of making sandwiches consists in slicing cooked meats or patting or squeezing ground meats and frying, and placing the cooked slices or fried patties between slices of bread or the two halves of a bun. The meat or filler therefore does not conform to the size and shape of the bread or bun, and except in the case of meats sliced by a mechanical slicer, the meat or filler is non-uniform in thickness, lacking in extent of the bread or bun in some places and projecting from the edges in others, forming sandwiches which are non-uniform in the amount, distribution, and thickness of the filler, and which do not display the delectable appearance which is secured when the filler is of uniform thickness about the peripheral edges of the sandwiching element and which filler is exactly coextensive therewith.

Also, where cooked meats, such as roasts, are sliced by hand, some slices are dry and others too moist resulting in dripping, and any juices transferred to the sandwiching element is usually transferred to only one side or element, such as the under-slice.

The method involved herein includes the cutting of meat into long strips which are comparatively small in cross-section, baking, roasting, or barbecuing the strips, and slicing the cooked strips into small, thin, steaks, whereby uniformity in cooking and juiciness is assured, and permitting the small steaks to be formed into sandwich fillers of predetermined thickness, area, and shape, and assuring uniformity in the sandwiches as to amount, distribution, condition of cooking, seasoning, quality and juiciness.

The main object of this invention is to overcome the disadvantages of present methods used in the making of sandwiches, and to provide means which will assure uniform serving of meat or filler with sandwiches, and in which the filler is of the same thickness throughout its peripheral extent, and which is exactly coextensive with the bread or bun, and in which the fillers for the sandwiches are of uniform juice content.

Another object of the invention is to provide means which drains surplus moisture from the cooked meats and which provides means for forming the cooked meats after slicing, to uniform size, shape and thickness, and which also provides means facilitating the making of sandwiches.

A further object of the invention is to provide a container for the sliced, cut, or chopped meats, and provide the container with mounting means for the sandwich filler forming means, and which mounting means will in no way hamper the proper cleansing of the container.

Other objects and advantages of the invention will become apparent as the following description is read on the drawing forming a part of this specification, and in which similar reference characters are used to designate similar parts throughout the several views, of which:

Fig. 1 is a sectional elevation through the invention showing the first step in the method of forming the sandwich, and showing the patty or filler-forming operation.

Fig. 2 is a fragmentary plan view of the invention.

Fig. 3 illustrates the second step; Fig. 4 illustrates the third step; and, Fig. 5 illustrates the fourth step in making a sandwich by this new method.

Fig. 6 is a modification of the invention in which the patty or filler is formed thinner at the center than at the periphery.

Fig. 7 shows the invention applied to a griddle or frying pan for frying meats, such as hamburger or sausage, to definite size and shape.

The invention consists of a support or disc 10 provided with a multiplicity of apertures 11, and having a handle 12; a receiver, former, or cup 13 having an annular shoulder or seat 14 located below the top edge 15 at a distance equal to the thickness of patty 16 desired for each sandwich.

This arrangement, if the element 13 is merely a sleeve or cylinder, can be used on a plate or in a pan, but the preferred method of use is to form the cup or former 13 somewhat similar to that shown, providing drain apertures 17 in the bottom for draining juices 18 back to the supply of meat 19 in the pan 20, this pan 20 being provided with a bayonet 21 on which the cup 13 is supported, as by an axial pedestal 22 integral with or affixed to the bottom of the cup, the disc 10 being herein designated as a false bottom to differentiate from the bottom of the cup.

The bayonet 21 is flared at its foot, into the bottom 23 of the pan as indicated at 24, to provide for convenient cleaning of the pan or container 20.

The meat 19 consists preferably of barbecued, roasted, baked or fried meats, which are first cut into long strips of small cross-section, about one-half to one inch in diameter, cooking, and then slicing the cooked strips into very thin cross-sectional or cross-grain steaks, preferably by means of a mechanical slicer, thereby forming very small, thin, tender slices which are retained in their natural juices in the pan 20.

When a sandwich is to be formed, a quantity of the meat 19 is placed in the patty former or cup 13, with the disc 10 resting on the shoulder 14, as shown in Fig. 1, and then struck off with a knife, spatula or similar instrument 25, which operation forms the patty or filler 16 of uniform thickness and of uniform shape and extent, the surplus juices 18 draining back into the container 20 through the passages 11 and 17.

The top half 26 of the bread or bun is then placed on top of the patty 16, and while this top half is supported by one hand 27, the other hand 28 by means of handle 12, lifts the patty 16 from the former, the partial assembly being then inverted as shown in Fig. 4 after which the support 10 is removed and placed back in the former, and in the meantime, part of the juices remaining in the meat 16 soaks into the top sandwiching element 26.

The bottom half, or lower sandwiching element 29 is then placed on top of the partial assembly as shown in Fig. 5, and the complete assembly is then turned right side up, providing a sandwich with filler of uniform thickness which is just coextensive with the sandwiching elements, with only superfluous juices removed and the remaining juices distributed between the upper and lower halves of the bun or upper and lower sandwiching elements.

When bread is used, the shape and size of the former 13, and support or disc 10, are made to conform to the shape and size of the bread.

When hamburger or sausage is to be used for the sandwich filler, it may be used in the same manner, by pre-choking, or the support 10 may be placed in a griddle 30 of suitable size, shape, and depth, the excess struck off as illustrated in Fig. 1, and the meat fried on one side, and turned for frying on the other side by inverting another support 10, turning the meat by means of the two supports 10 and frying the other side by support on the second support 10, the disc 10 thus forming a grid.

These supports or grids 10 may be formed of foraminous metal or from screen; the holes forming means for draining superfluous juices, and also to break any vacuum that may exist between the patty and the grid and permit suitable separation following the assembly operation shown in Fig. 4, without disturbing the individual bits of meat forming the patty.

The modification in Fig. 6 simply resides in forming the grid 31 to convex shape as shown, in which case the patty will be thick about the edge or periphery, and decrease in thickness toward the center.

The strips previously referred to are cut along the grain, with a cross-sectional area of about ¾ square inch for most delectable results in cooking, and the preferred method of cooking is barbecuing these strips.

As will be realized, by this method a sandwich is formed which does not contain an excessive amount of juices, but does contain a desirable amount, and no juices are wasted, and the filler will be fully coextensive with the sandwiching means, such as bread or bun, without protruding from the edges at any point, and the peripheral edge of the filler will be uniform in thickness throughout its extent.

The sandwich is quickly and easily made, delicious in appearance, always uniform in filler or meat content, and the juices are distributed between the upper and lower sandwiching elements.

It will be understood that variations in construction and arrangement of parts, which variations are consistent with the appended claims, may be resorted to without detracting from the spirit or scope of the invention, or sacrificing any of the advantages thereof.

I claim:

1. A sandwich filler former, in combination, an open-top receiver and a removable bottom therefor provided with combined drain and suction-release passages, and with a handle, and located a predetermined distance below said top; a bottom for said receiver spaced below said removable bottom to form a free space below said removable bottom to permit free drainage of juices from the filler as it is being formed; drain passages formed in said bottom; a pedestal integral with said bottom and forming means for supporting said former in a receptacle.

2. A sandwich filler former, in combination, an open-top receiver and a removable bottom therefor provided with combined drain and suction-release passages, and with a handle, and located a predetermined distance below said top; a bottom for said receiver; a bayonet type support projecting upwardly from the bottom of a receptacle and having its lower end flared into the bottom of the receptacle to permit convenient cleaning about and of said bayonet type support; and a pedestal dependent from the bottom of said receiver and having a flared recess formed axially in the lower end for non-binding support on said bayonet type support.

3. A sandwich filler former comprising a receiver having side walls, a bottom and a top edge; a false-bottom support located a predetermined distance below said top edge and spaced above said bottom; a false bottom removably supported on said support and having a handle projecting from one side edge and outside the walls of said receiver; said false bottom and said bottom each having a plurality of combined drain and suction breaking apertures formed therein; said false bottom functioning as a filler manipulator after the filler is formed thereon to specific thickness by striking the filler off with an element struck across said top edge.

KENNETH E. BEMIS.